United States Patent
Nepveu et al.

(10) Patent No.: US 11,521,291 B1
(45) Date of Patent: Dec. 6, 2022

(54) METHOD AND DEVICE FOR LATENCY REDUCTION OF AN IMAGE PROCESSING PIPELINE

(71) Applicant: Apple Inc., Cupertino, CA (US)

(72) Inventors: Bertrand Nepveu, Montreal (CA); Marc-Andre Chenier, Saint-Hyacinthe (CA); Yan Cote, Notre-Dame-De-L'ile-Perrot (CA); Yves Millette, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 109 days.

(21) Appl. No.: 17/215,151

(22) Filed: Mar. 29, 2021

Related U.S. Application Data

(60) Provisional application No. 63/007,005, filed on Apr. 8, 2020.

(51) Int. Cl.
| | | |
|---|---|---|
| *G06T 1/20* | (2006.01) | |
| *G06T 19/00* | (2011.01) | |
| *G06T 7/73* | (2017.01) | |
| *G06T 15/20* | (2011.01) | |
| *G06T 5/00* | (2006.01) | |
| *G06T 15/00* | (2011.01) | |

(52) U.S. Cl.
CPC ................ *G06T 1/20* (2013.01); *G06T 5/003* (2013.01); *G06T 5/007* (2013.01); *G06T 7/73* (2017.01); *G06T 15/005* (2013.01); *G06T 15/20* (2013.01); *G06T 19/006* (2013.01)

(58) Field of Classification Search
None
See application file for complete search history.

(56) References Cited

U.S. PATENT DOCUMENTS

| 7,408,986 B2 | 8/2008 | Winder |
|---|---|---|
| 8,233,701 B2 | 7/2012 | Frakes et al. |
| 9,521,411 B2 | 12/2016 | Raveendran et al. |

(Continued)

FOREIGN PATENT DOCUMENTS

CN 106228506 A 12/2016

OTHER PUBLICATIONS

Michael S. Brown, "Understanding the In-Camera Image Processing Pipeline for Computer Vision," IEEE International Conference on Computer Vision (ICCV)-Tutorial, vol. 3, 2019, pp. 1-354.

(Continued)

*Primary Examiner* — Robert J Craddock
(74) *Attorney, Agent, or Firm* — Fernando & Partners, LLP

(57) ABSTRACT

In some implementations, a method of reducing latency associated with an image read-out operation is performed at a device including one or more processors, non-transitory memory, an image processing architecture, and an image capture device. The method includes: obtaining first image data corresponding to a physical environment; reading a first slice of the first image data into an input buffer; performing processing operations on the first slice of the first image data to obtain a first portion of second image data; reading a second slice of the first image data into the input buffer; performing the image processing operations on the second slice of the first image data to obtain a second portion of the second image data; and generating an image frame of the physical environment based at least in part on the first and second portions of the second image data.

22 Claims, 10 Drawing Sheets

(56) References Cited

U.S. PATENT DOCUMENTS

| | | |
|---|---|---|
| 9,524,138 B2 | 12/2016 | Boucher et al. |
| 10,306,140 B2 | 5/2019 | Tico et al. |
| 2008/0181314 A1 | 7/2008 | Tsuda et al. |
| 2010/0165151 A1* | 7/2010 | Chitnis ................ H04N 1/2137 |
| | | 348/E7.003 |
| 2012/0001905 A1 | 1/2012 | Andonieh et al. |
| 2013/0004071 A1 | 1/2013 | Chang et al. |
| 2018/0302573 A1* | 10/2018 | Zobel ................ H04N 5/23245 |

OTHER PUBLICATIONS

Bo-Ching Huang et al., "Image Pipeline Algorithms for Standard Mobile Imaging Architecture Sensors," 18th IPPR Conference on Computer Vision, Graphics and Image Processing (CVGIP 2005), pp. 1118-1125.

Kari Pulli, "Camera Processing Pipeline," Retrieved from the Internet: https://web.stanford.edu/class/cs2, 2015, pp. 1-78.

* cited by examiner

METHOD AND DEVICE FOR LATENCY REDUCTION OF AN IMAGE PROCESSING PIPELINE

CROSS-REFERENCE TO RELATED APPLICATIONS

This application claims the benefit of U.S. Provisional Patent App. No. 63/007,005, filed on Apr. 8, 2020, which is incorporated by reference in its entirety.

TECHNICAL FIELD

The present disclosure generally relates to image processing pipelines, and in particular, to systems, methods, and devices for reducing latency of captured image read-out and rendered image scan-out operations in an image processing pipeline.

BACKGROUND

In some instances, motion sickness (sometimes also referred to as "cybersickness") induced by extended reality (XR) content is a major hurdle to the adoption thereof. One way to reduce motion sickness is to boost the frame rate to at least 60 frames-per-second (fps). Put another way, the end-to-end (E2E) image processing pipeline for video pass-through should be completed in approximately less than 20 ms. As one bottleneck in this E2E image processing pipeline, a read-out operation of an image data frame from an image sensor may consume approximately 6 ms of the overall time budget. Furthermore, display scan-out is another bottleneck in this E2E image processing pipeline.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
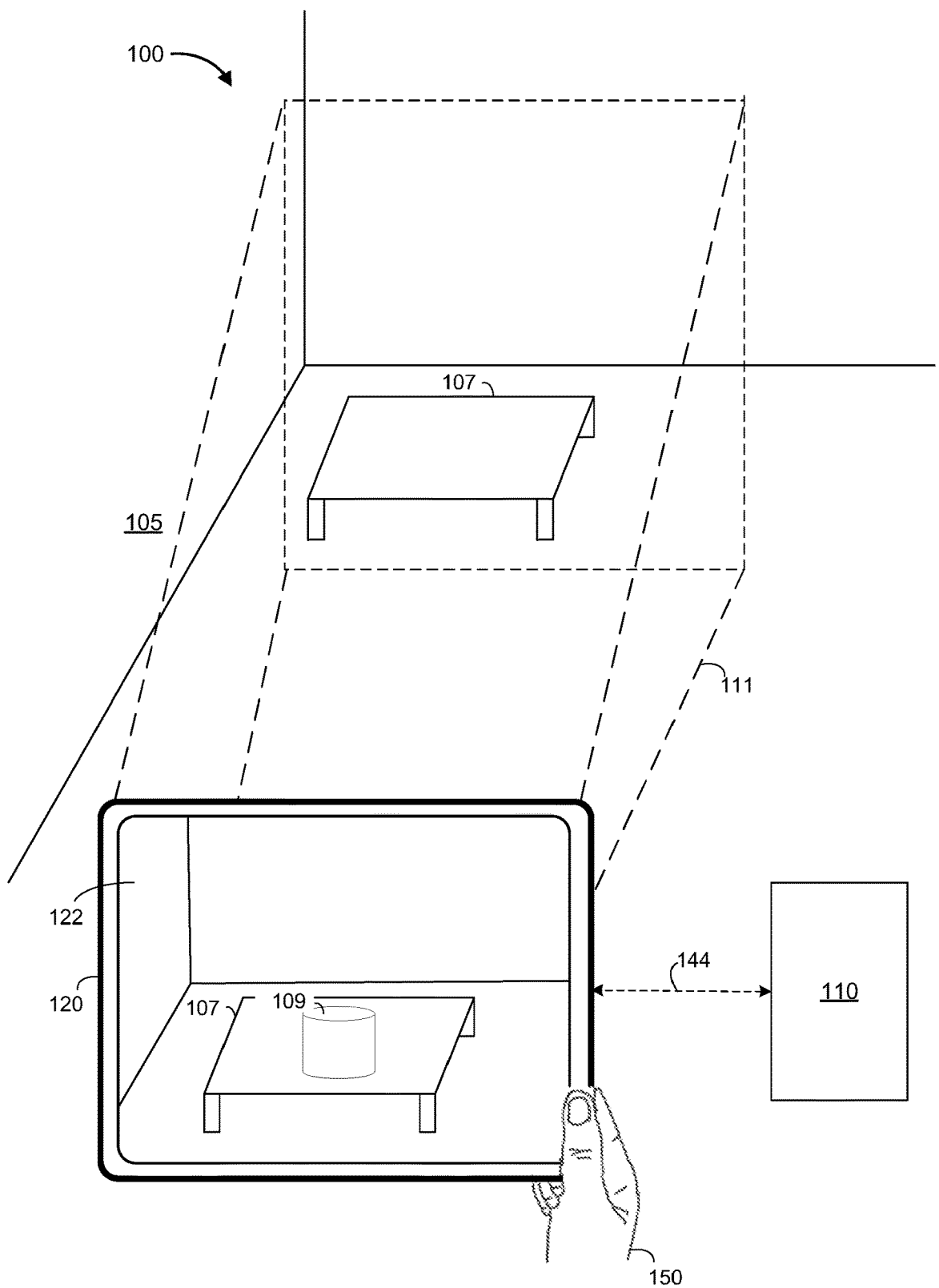
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for reducing latency associated with an image read-out operation. According to some implementations, the method is performed at a device including one or more processors, non-transitory memory, an image processing architecture, and an image capture device including a photodiode and a front-end architecture. The method includes: obtaining, via the image capture device, first image data corresponding to a physical environment; reading a first slice of the first image data into one or more input buffers of the image processing architecture; performing, at the image processing architecture, one or more image processing operations on the first slice of the first image data to obtain a first portion of second image data; reading a second slice of the first image data into the one or more input buffers of the image processing architecture; performing, at the image processing architecture, the one or more image processing operations on the second slice of the first image data to obtain a second portion of the second image data; and generating an image frame of the physical environment based at least in part on the first and second portions of the second image data.

Various implementations disclosed herein include devices, systems, and methods for reducing latency associated with a display scan-out operation. According to some implementations, the method is performed at a device including one or more processors and non-transitory memory. The method includes: obtaining first image data associated with a physical environment that corresponds to a first time period; determining a complexity value for the first image data; determining an estimated composite setup time based on the complexity value for the first image data and virtual content for compositing with the first image data. In accordance with a determination that the estimated composite setup time fails to exceed a threshold time, the method includes: rendering the virtual content from a perspective that corresponds to a camera pose of the device relative to the physical environment during the first time period; and compositing the rendered virtual content with the first image data to generate a graphical environment for the first time period. In accordance with a determination that the estimated composite setup time exceeds the threshold time, the method includes: forgoing rendering the virtual content from the perspective that corresponds to the camera pose of the device relative to the physical environment during the first time period; and compositing a previous render of the virtual content for a previous time period with the first image data to generate the graphical environment for the first time period.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, ahead mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, wearable computing device, or the like).

In some implementations, the controller 110 is configured to manage and coordinate an XR experience for a user 150 (sometimes also referred to herein as a "XR environment" or a "graphical environment") and zero or more other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment

105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR experience to the user 150. In some implementations, the electronic device 120 includes a suitable combination of software, firmware, and/or hardware. The electronic device 120 is described in greater detail below with respect to FIG. 3.

According to some implementations, the electronic device 120 presents an extended reality (XR) experience to the user 150 while the user 150 is physically present within a physical environment 105 that includes a table 107 within the field-of-view 111 of the electronic device 120. As such, in some implementations, the user 150 holds the electronic device 120 in his/her hand(s). In some implementations, while presenting the XR experience, the electronic device 120 is configured to present XR content (e.g., an XR cylinder 109) and to enable video pass-through of the physical environment 105 (e.g., including the table 107) on a display 122. For example, the electronic device 120 corresponds to a mobile phone, tablet, laptop, wearable computing device, or the like.

In one example, the XR content corresponds to display-locked content such that the XR content (e.g., the XR cylinder 109) remains displayed at the same location on the display 122 as the FOV 111 changes due to translational and/or rotational movement of the electronic device 120. As another example, the XR content corresponds to world-locked content such that the XR content remains displayed at its origin location as the FOV 111 changes due to translational and/or rotational movement of the electronic device 120. As such, in this example, if the FOV 111 does not include the origin location, the XR experience will not include the XR content.

In some implementations, the display 122 corresponds to an additive display that enables optical see-through of the physical environment 105 including the table 107. For example, the display 122 correspond to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the field-of-view of the user 150. In such implementations, the electronic device 120 presents the XR environment by displaying data corresponding to the XR environment on the one or more displays or by projecting data corresponding to the XR environment onto the retinas of the user 150.

In some implementations, the electronic device 120 includes an integrated display (e.g., a built-in display) that displays the XR environment. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment based on movement information (e.g., body/head pose data, eye tracking data, hand/limb tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
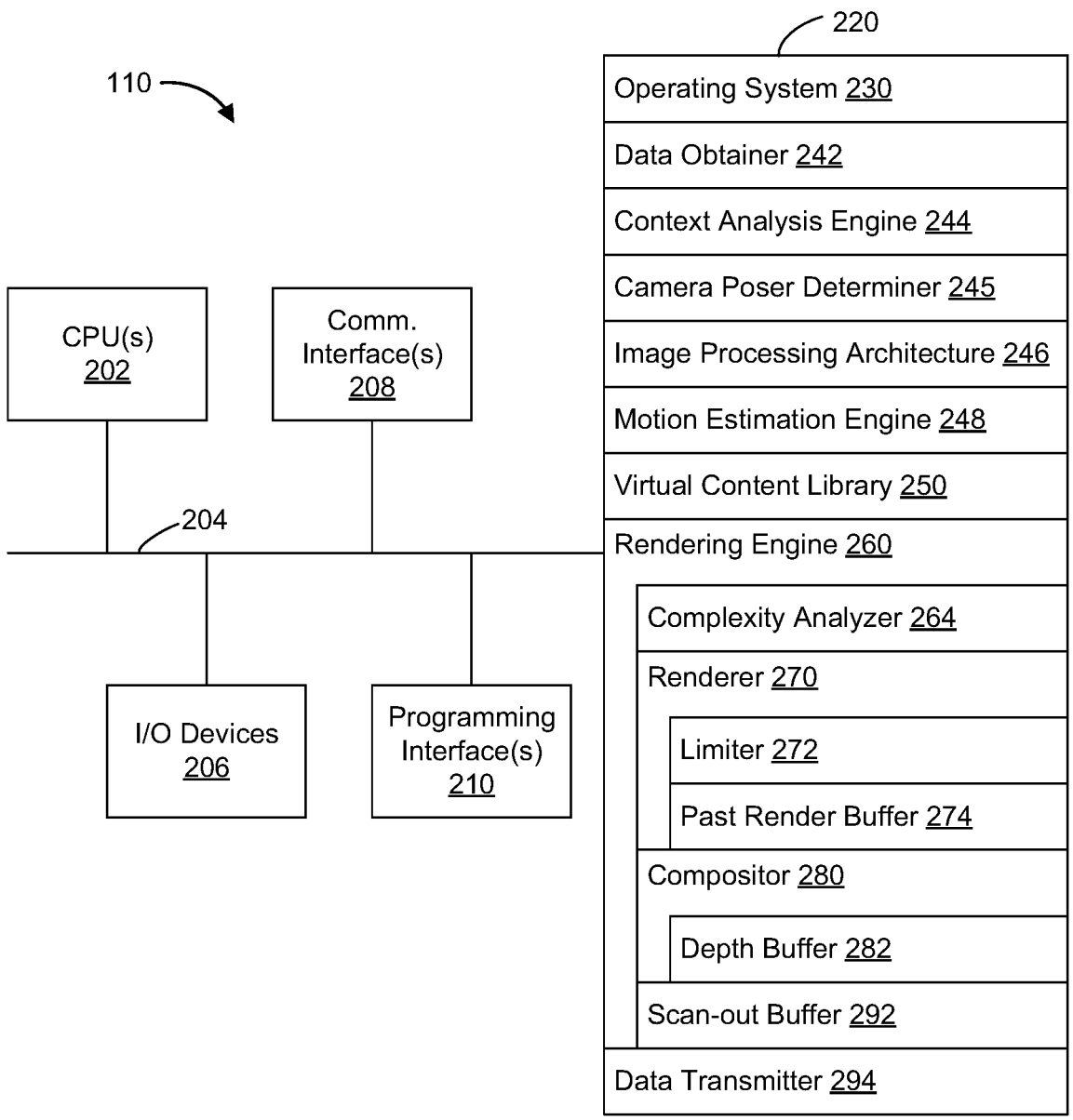
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), GPUs, central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touchscreen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230, a data obtainer 242, a context analysis engine 244, a camera pose determiner 245, an image processing architecture 246, a motion estimation engine 248, a virtual content library 250, a rendering engine 260, and a data transmitter 294.

The operating system 230 includes procedures for handling various basic system services and for performing hardware dependent tasks.

In some implementations, the data obtainer 242 is configured to obtain data (e.g., presentation data, input data, user interaction data, body/limb/head tracking information, camera pose tracking information, eye tracking information, sensor data, location data, etc.) from at least one of the I/O devices 206 of the controller 110, the electronic device 120, and the optional remote input devices. To that end, in various implementations, the data obtainer 242 includes instructions and/or logic therefor, and heuristics and metadata therefor.

In some implementations, the context analysis engine 244 is configured to generate contextual information based on position, rotation, and movement information from the IMU 362, gaze direction information from the eye tracking engine 364, and body/limb/head pose information from the body/limb/head pose tracking engine 366. To that end, in various implementations, the context analysis engine 244 includes instructions and/or logic therefor, and heuristics and metadata therefor. The context analysis engine 244 is described in more detail below with reference to FIG. 5.

In some implementations, the camera pose determiner 245 is configured to determine a camera pose relative to virtual content based on the contextual information. To that end, in various implementations, the camera pose determiner 245 includes instructions and/or logic therefor, and heuristics and metadata therefor.

In some implementations, the image processing architecture 246 is configured to process images from the image capture device 370 such as converting first image data (e.g., RAW image data) to second image data (e.g., RGB image data). To that end, in various implementations, the image processing architecture 246 includes instructions and/or logic therefor, and heuristics and metadata therefor. The image processing architecture 246 is described in more detail below with reference to FIGS. 5, 6A and 6B.

In some implementations, the motion estimation engine 248 is configured to generate a motion vector based on one or more image frames of the physical environment 105. To that end, in various implementations, the motion estimation engine 248 includes instructions and/or logic therefor, and heuristics and metadata therefor. The motion estimation engine 248 is described in more detail below with reference to FIG. 5.

In some implementations, the virtual content library 250 includes virtual content (sometimes also referred to herein as "XR content") stored local to and/or remote from the controller 110.

In some implementations, the rendering engine 260 is configured to render virtual content based on a relative camera pose thereto and to composite the rendered virtual content with the one or more image frames of the physical environment 105. To that end, in various implementations, the rendering engine 260 includes a complexity analyzer 264, a renderer 270, a compositor 280, and a scan-out buffer 292.

In some implementations, the complexity analyzer 264 is configured to determine a complexity value or vector based on one or more images of the physical environment 105. To that end, in various implementations, the complexity analyzer 264 includes instructions and/or logic therefor, and heuristics and metadata therefor.

In some implementations, the renderer 270 is configured to render virtual content based on a relative camera pose thereto. To that end, in various implementations, the renderer 270 includes instructions and/or logic therefor, and heuristics and metadata therefor. In some implementations, the renderer 270 includes (or accesses) a limiter 272 and a past render buffer 274. In some implementations, the past render buffer 274 stores rendered virtual content from one or more past time periods.

In some implementations, the limiter 272 is configured to determine an estimated composite setup time for a next image frame based at least in part on the complexity value or vector. To that end, in various implementations, the compositor 280 includes instructions and/or logic therefor, and heuristics and metadata therefor.

In some implementations, the compositor 280 is configured to composite the rendered virtual content with the one or more image frames of the physical environment 105 to generate one or more composited image frames for a graphical environment (sometimes also referred to herein as the "XR environment"). To that end, in various implementations, the compositor 280 includes instructions and/or logic therefor, and heuristics and metadata therefor.

In some implementations, the compositor 280 includes (or accesses) a depth buffer 282 (e.g., a z-buffer). In some implementations, the depth buffer 282 corresponds to a depth mesh, a point cloud, and/or the like for the physical environment that is used to maintain appropriate z-order between the virtual content and objects/scenery in the physical environment.

In accordance with a determination that the estimated composite setup time fails to exceed a threshold time, the renderer 270 renders virtual content from a perspective that corresponds to a camera pose of the device relative to the physical environment 105 for a current time period, and the compositor 280 composites the rendered virtual content with the one or more images of the physical environment 105 to generate a graphical environment (sometimes also referred to herein as the "XR environment"). In accordance with a determination that the estimated composite setup time exceeds the threshold time, the renderer 270 foregoes rendering the virtual content from the perspective that corresponds to the camera pose of the device relative to the physical environment 105 for the current time period, and the compositor 280 composites the rendered virtual content for a past time period in the past render buffer 274 with the one or more images of the physical environment 105 to generate a graphical environment (sometimes also referred to herein as the "XR environment").

In some implementations, the scan-out buffer 292 stores the one or more composited image frames for a graphical environment (sometimes also referred to herein as the "XR environment").

In some implementations, the data transmitter 294 is configured to transmit data (e.g., presentation data such as composited image frames for the graphical environment, location data, etc.) to at least the electronic device 120. To that end, in various implementations, the data transmitter 294 includes instructions and/or logic therefor, and heuristics and metadata therefor.

Although the data obtainer 242, the context analysis engine 244, the image processing architecture 246, the motion estimation engine 248, the camera pose determiner 249, the virtual content library 250, the rendering engine 260, and the data transmitter 294 are shown as residing on a single device (e.g., the controller 110), it should be understood that in other implementations, any combination of the data obtainer 242, the context analysis engine 244, the image processing architecture 246, the motion estimation engine 248, the camera pose determiner 249, the virtual content library 250, the rendering engine 260, and the data transmitter 294 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
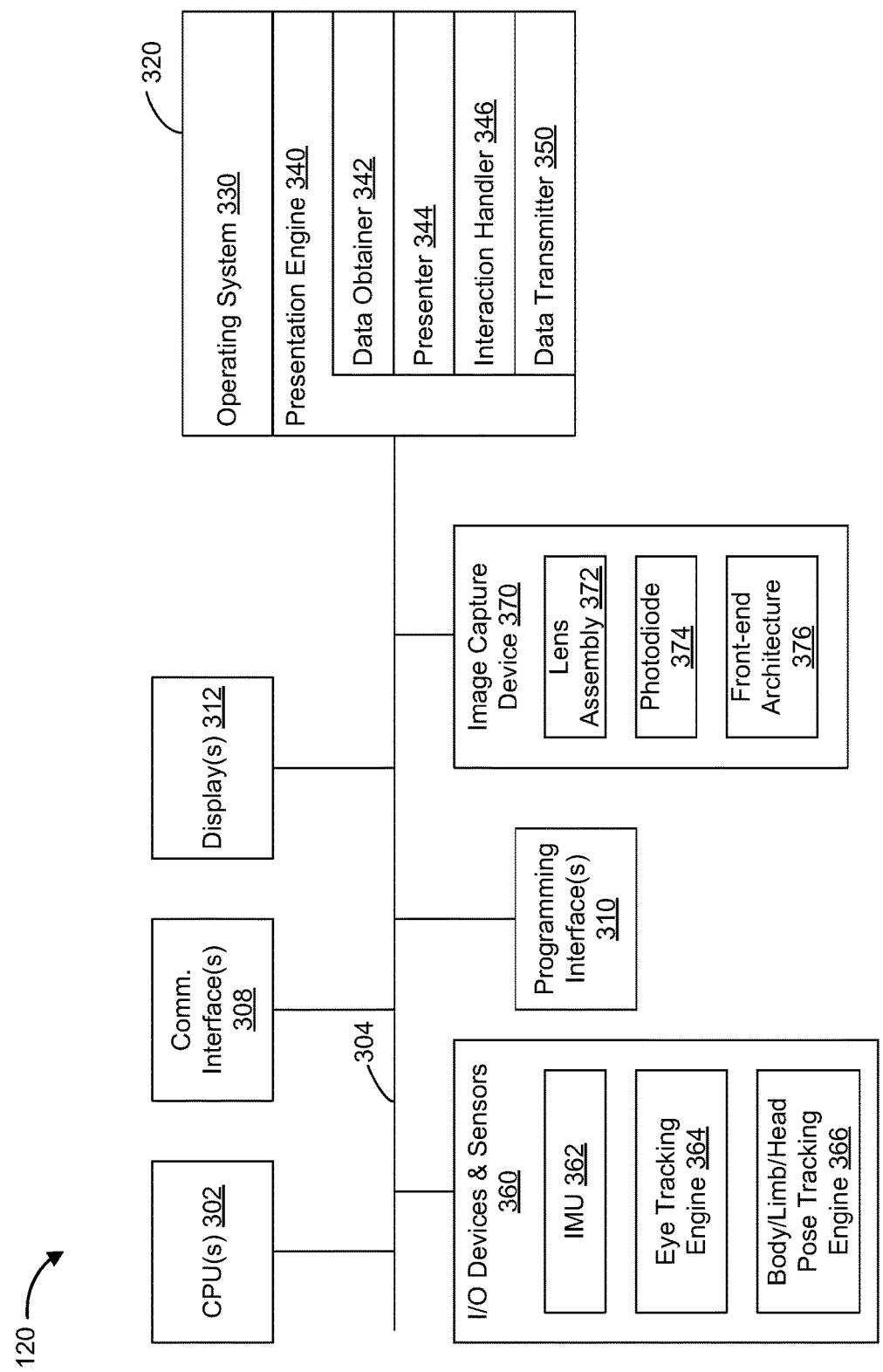
FIG. 3 is a block diagram of an example electronic device in accordance with some implementations.

FIG. 3 is a block diagram of an example of the electronic device 120 (e.g., a mobile phone, tablet, laptop, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 360, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 360 include at least one of an inertial measurement unit (IMU) 362, an accelerometer, a gyroscope, a magnetometer, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, one or more depth sensors (e.g., structured light, time-of-flight, or the like), an eye tracking engine 364, a body/limb/head pose tracking engine 366, a camera pose tracking engine, and/or the like.

In some implementations, the IMU 362 (along with the accelerometer, gyroscope, and the like) is configured to collect position/rotation/movement information 402 with respect to the electronic device 120. In some implementations, the eye tracking engine 364 is configured to determine a gaze direction 404 of the user 150 based on eye tracking information. In some implementations, the body/limb/head pose tracking engine 366 is configured to determine body/limb/head pose information 406 associated with the user 150 of the electronic device 120.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly 372, a photodiode 374, and a front-end architecture 376. The image capture device 370 and the components thereof are described in more detail below with reference to FIGS. 6A and 6B.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation engine 340.

The operating system 330 includes procedures for handling various basic system services and for performing hardware dependent tasks. In some implementations, the XR presentation engine 340 is configured to present XR content to the user via the one or more displays 312. To that end, in various implementations, the XR presentation engine 340 includes a data obtainer 342, a presenter 344, an interaction handler 346, and a data transmitter 350.

In some implementations, the data obtainer 342 is configured to obtain data (e.g., presentation data such as composited image frames for the graphical environment, input data, user interaction data, body/limb/head tracking information, camera pose tracking information, eye tracking information, sensor data, location data, etc.) from at least one of the I/O devices and sensors 360 of the electronic device 120, the controller 110, and the remote input devices. To that end, in various implementations, the data obtainer 342 includes instructions and/or logic therefor, and heuristics and metadata therefor.

In some implementations, the presenter 344 is configured to present and update XR content (e.g., the rendered image frames associated with the XR environment or composited image frames for the graphical environment) via the one or more displays 312. To that end, in various implementations, the presenter 344 includes instructions and/or logic therefor, and heuristics and metadata therefor.

In some implementations, the interaction handler 346 is configured to detect user interactions with the presented XR content. To that end, in various implementations, the interaction handler 346 includes instructions and/or logic therefor, and heuristics and metadata therefor.

In some implementations, the data transmitter 350 is configured to transmit data (e.g., presentation data, location data, user interaction data, body/limb/head tracking information, camera pose tracking information, eye tracking information, etc.) to at least the controller 110. To that end, in various implementations, the data transmitter 350 includes instructions and/or logic therefor, and heuristics and metadata therefor.

Although the data obtainer 342, the presenter 344, the interaction handler 346, and the data transmitter 350 are shown as residing on a single device (e.g., the electronic device 120), it should be understood that in other implementations, any combination of the data obtainer 342, the presenter 344, the interaction handler 346, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
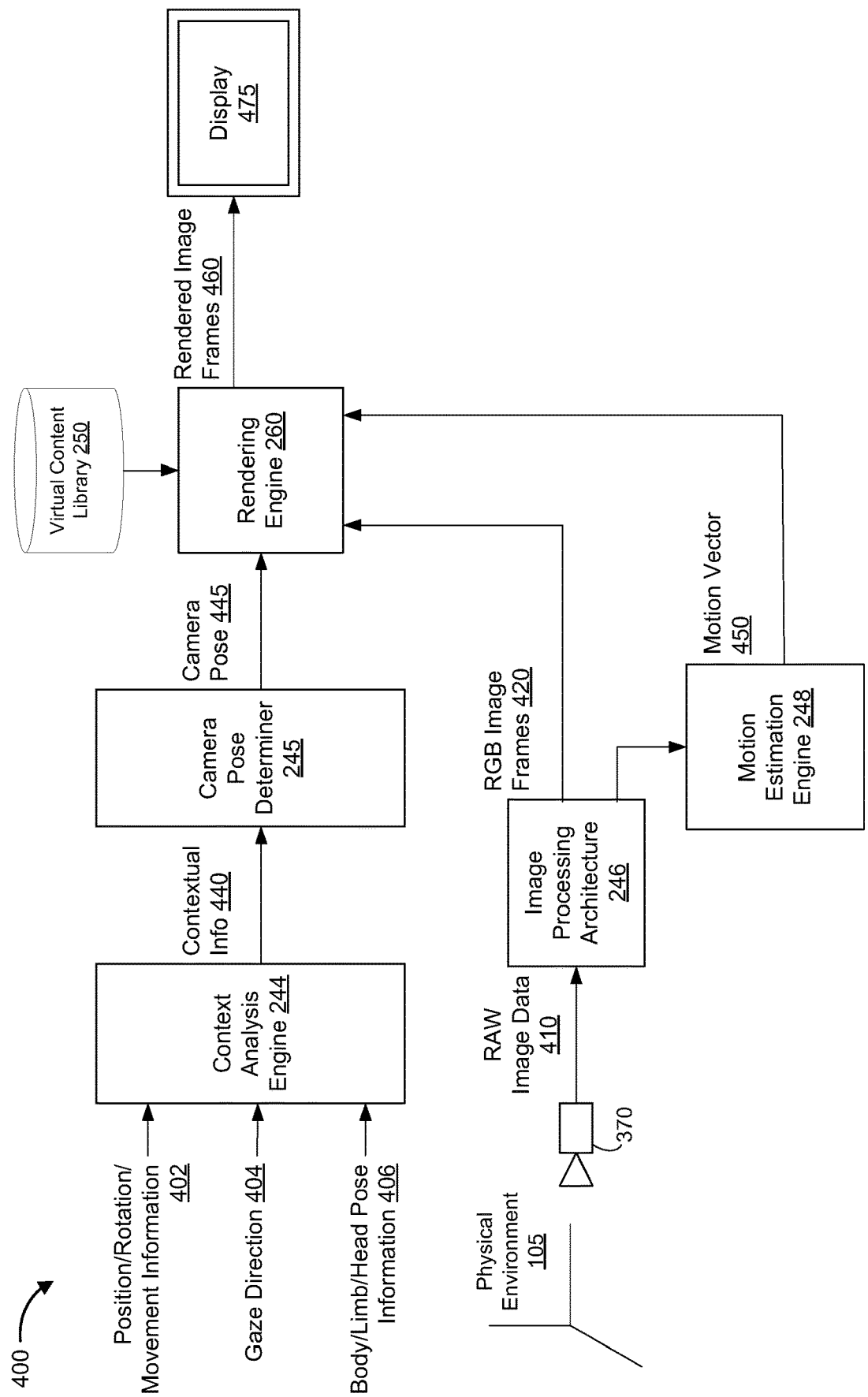
FIG. 4 is a block diagram of an example image processing environment in accordance with some implementations.

FIG. 4 is a block diagram of an example image processing environment 400 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the image processing environment 400 includes the image capture device 370, the image processing architecture 246, the motion estimation engine 248, the context analysis engine 244, the camera pose determiner 245, the rendering engine 260, and a display 475 (e.g., one of the one or more displays 312 of the electronic device 120 in FIG. 3).

As shown in FIG. 4, the image capture device 370 captures RAW image data 410 (e.g., a stream of RAW image frames or first image data) associated with the physical environment 105. The image processing architecture 246 processes the RAW image data 410 in order to generate RGB image frames 420 (e.g., second image data). One of ordinary skill in the art will appreciate that in various implementations the second image data may be associated with various color spaces different from RGB such as YCbCr, CMYK, or the like. The image capture device 370 and the image processing architecture 246 are described in more detail below with reference to FIGS. 6A and 6B.

As shown in FIG. 4, the motion estimation engine 248 determines a motion vector 450 based on the RGB image frames 420. As shown in FIG. 4, the context analysis engine 244 generates contextual information 440 based on position/rotation/movement information 402 from the IMU 362 or the like, gaze direction information 404 from the eye tracking engine 364, and body/limb/head pose information 406 from the body/limb/head pose tracking engine 366. The camera pose determiner 245 determines a camera pose 445 of the electronic device 120 (and also, ergo, the user 150) relative to the physical environment 105 based on the contextual information 440. One of ordinary skill in the art will appreciate that in various implementations the camera pose 445 may be determined based on the RGB image frames 420 when sufficient information associated with the physical environment 105 is known (e.g., a point cloud, a depth mesh, or the like) in order to utilize a perspective-n-point (PnP) technique, a simultaneous localization and mapping (SLAM) technique, and/or the like. One of ordinary skill in the art will appreciate that in various implementations the contextual information 440 may be provided to various other components of the image processing environment 400 in place of or in addition to the camera pose determiner 245. One of ordinary skill in the art will appreciate that in various implementations the motion vector 450 may be used to predict changes to the camera pose 445.

As shown in FIG. 4, the rendering engine 260 renders virtual content from the virtual content library 250 based on the relative camera pose 445 thereto, and the rendering engine 260 composites the rendered virtual content with the RGB image frames 420 to generate a stream of rendered image frames 460 (sometimes also referred to herein as "composited image frames"). The rendering engine 260 is described in more detail below with reference to FIG. 7.

As shown in FIG. 4, the display 475 displays the stream of rendered image frames 460 according to a refresh frequency (e.g., 60 Hz). One of ordinary skill in the art will appreciate that in various implementations there may be multiple image capture devices and a display for each eye of the user. In some implementations, the display 475 is replaced with an external display. In some implementations, the display 475 is replaced with a cloud-based recorder, a re-encoder, or the like that is accessible to an end-user device.

Figure 5:
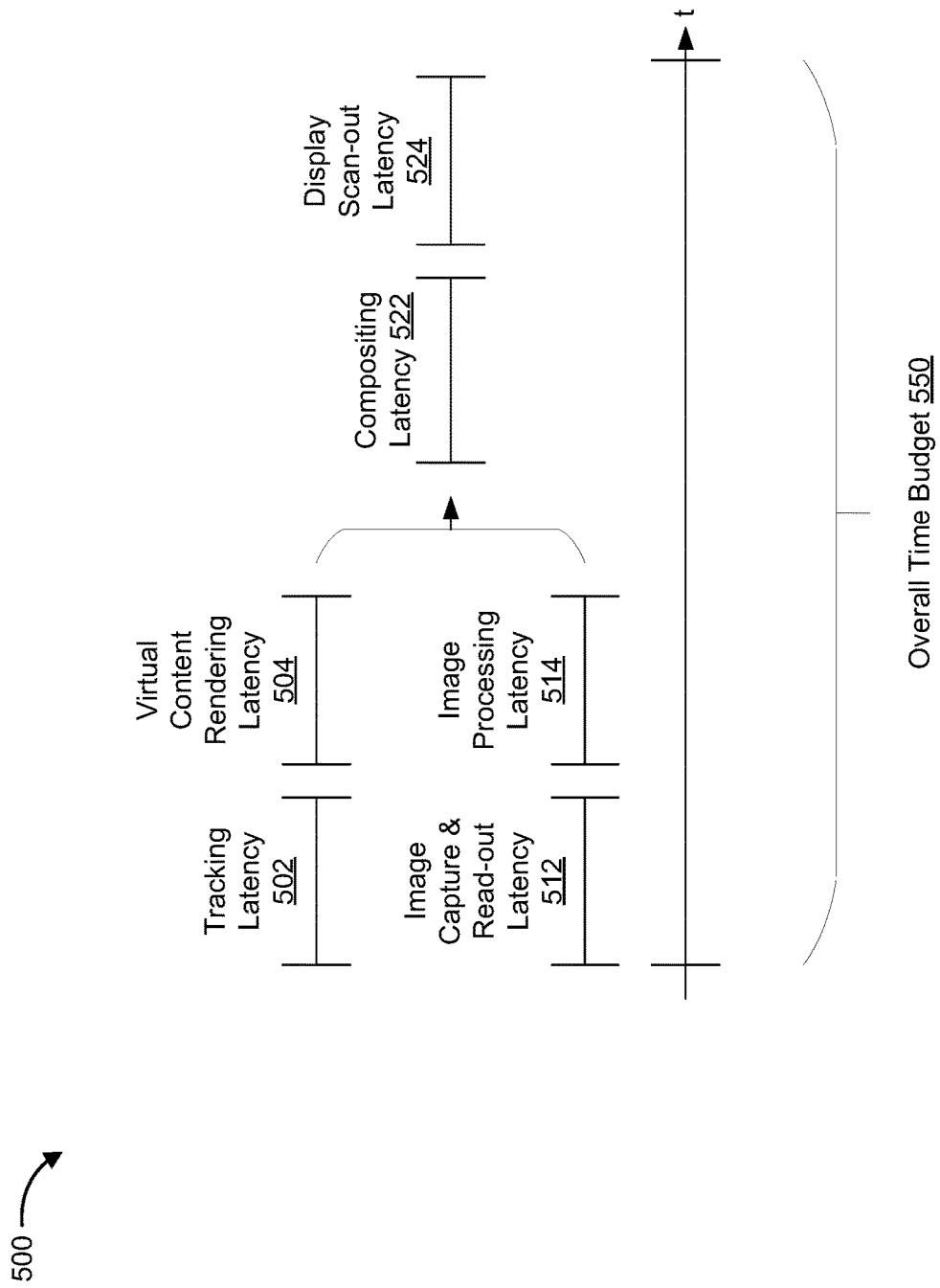
FIG. 5 is a conceptual latency diagram for the image processing environment in FIG. 4 in accordance with some implementations.

FIG. 5 is a conceptual latency diagram 500 for the image processing environment in FIG. 4 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the conceptual latency diagram 500 corresponds to the latency associated with operations in an E2E image processing pipeline for video pass-through. As one example, the conceptual latency diagram 500 is associated with an overall time budget 550 (e.g., less than 20 ms). As one example, the overall time budget 550 reduces user discomfort and/or motion sickness when viewing XR content. To this end, the overall time budget 550 is based at least in part on a preferred frame rate (e.g., 60 or 90 fps) and/or a display refresh (e.g., 60 Hz).

For example, as shown in FIG. 5, some portions of the conceptual latency diagram 500 correspond to operations that occur sequentially or in parallel. For example, in some implementations, the conceptual latency diagram 500 includes tracking latency 502 associated with eye tracking and/or body/limb/head pose tracking and virtual content rendering latency 504 associated with rendering virtual content relative to a particular camera pose. For example, in some implementations, the conceptual latency diagram 500 further includes image capture and read-out latency 512 associated with capturing image frames of a physical environment and reading those image frames out of an image capture device and image processing latency 514 associated with processing image frames from the image capture device (e.g., transforming RAW image data into RGB image data).

For example, in some implementations, the conceptual latency diagram 500 further includes compositing latency 522 associated with compositing the virtual content with the image frames of the physical environment and display scan-out latency 524 associated displaying the composited image frames. One of ordinary skill in the art will appreciate that the conceptual latency diagram 500 is merely an example and that various other operations or considerations may add latency to the E2E image processing pipeline for video pass-through.

Figure 6A:
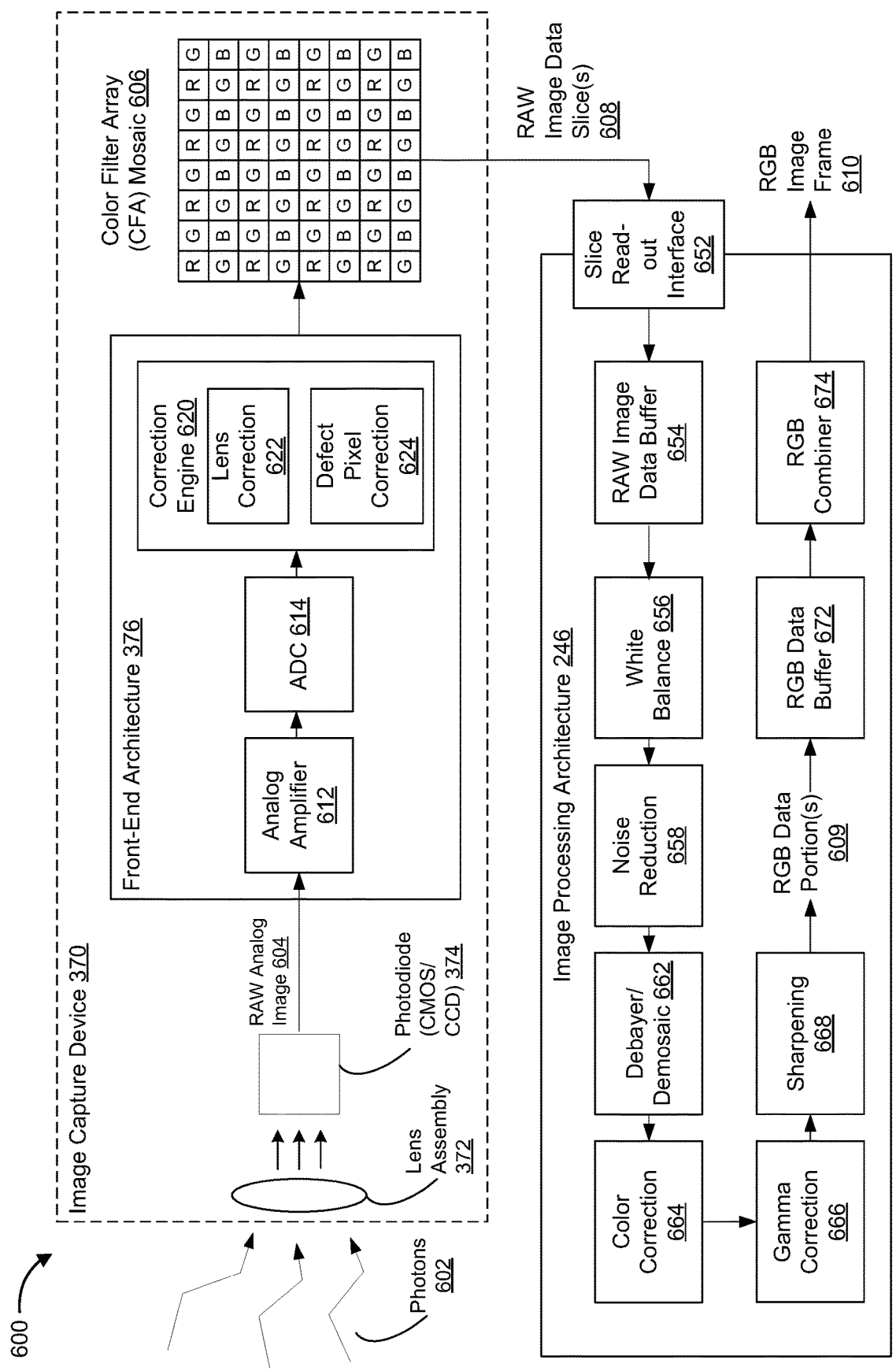
FIG. 6A illustrates a block diagram of an example image preprocessing architecture in accordance with some implementations.

FIG. 6A illustrates a block diagram of an example image preprocessing architecture 600 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the image preprocessing architecture 600 includes the image capture device 370 and the image processing architecture 246.

As shown in FIG. 6A, the lens assembly 372 focuses photons 602 onto the photodiode 374 (e.g., a CMOS or CCD device). The photodiode 374 generates a RAW analog image 604 that is fed to a front-end architecture 376, which includes an analog amplifier 612 and an analog-to-digital converter (ADC) 614. A correction engine 620 performs one or more operations and/or algorithms on the output of the ADC 614 such as lens correction 622, defect pixel correction 624, and/or the like. As such, the output of the image capture device 370 is a color filter array (CFA) mosaic 606 (sometimes referred to herein as "first image data"), which may also be referred to in the art as a "RAW Bayer input" or "RAW image data."

As shown in FIG. 6A, the image processing architecture 246 includes a slice read-out interface 652 that reads-out RAW image data slices 608 (e.g., rows or lines) of the CFA mosaic 606 from the image capture device 370 into the RAW image data buffer 654. As one example, the RAW image data buffer 654 corresponds to a first-in-first out (FIFO) buffer or the like. In some implementations, the RAW image data buffer 654 corresponds to a single buffer or a plurality of buffers.

Thereafter, the image processing architecture 246 performs one or more operations and/or algorithms on the RAW image data slices 608 on a per slice basis, such as white balance 656, noise reduction 658, debayering/demosaicking 662, color correction 664, gamma correction 666, and sharpening 668, in order to produce RGB data portions 609. The RGB data portions 609 are accumulated in an RGB data buffer 672 until the RGB combiner 674 combines RGB data portions 609 from the RGB data buffer 672 into an RGB image frame 610. In some implementations, the RGB data buffer 672 corresponds to a single buffer or a plurality of buffers. As noted above, one of ordinary skill in the art will appreciate that in various implementations the RGB data portions 609 and the RGB image frame 610 may be replaced with data portions and image frames that are associated with various other color spaces different from RGB such as YCbCr, CMYK, or the like One of ordinary skill in the art will appreciate that the operations and/or algorithms described herein with reference to FIG. 6A are merely exemplary and that other operations and/or algorithms may be performed in various other implementations. Furthermore, one of ordinary skill in the art will appreciate that the order of the operations and/or algorithms described herein with reference to FIG. 6A is merely exemplary and that the operations and/or algorithms may be performed in other orders, sequences, and/or in parallel in various other implementations. In some implementations, the image preprocessing architecture 600 reduces the image capture and read-out latency 512 by performing one or more operations and/or algorithms on the CFA mosaic 606 on a per slice basis.

Figure 6B:
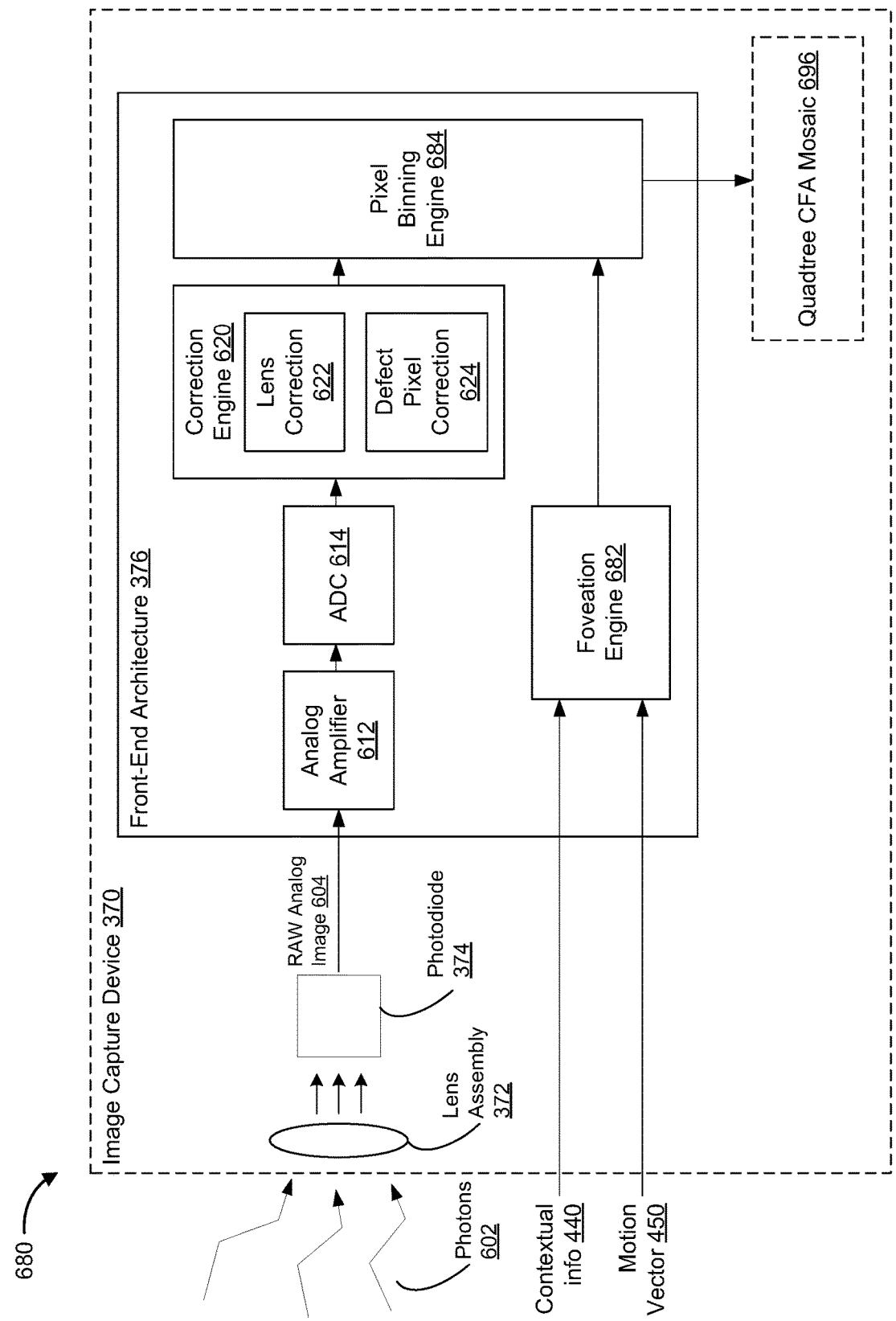
FIG. 6B illustrates a block diagram of an example image preprocessing architecture in accordance with some implementations.

FIG. 6B illustrates a block diagram of an example image preprocessing architecture 680 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. The image preprocessing architecture 680 in FIG. 6B is similar to and adapted from the image preprocessing architecture 600 in FIG. 6A. As such, common references numbers are used herein and only the differences between FIGS. 6A and 6B will be discussed for the sake of brevity.

To that end, as anon-limiting example, in some implementations, the contextual information 440 and/or the motion vector 450 described in FIG. 4 may be fed to a foveation engine 682 within the front-end architecture 376, which determines a focal region based on, for example, gaze direction. Thereafter, a pixel binning engine 684 produces a quadtree CFA mosaic 696 where pixels within the focal region are associated with smaller quad nodes resulting in higher resolution as compared to pixels outside of the focal region associated with larger quad nodes resulting in lower resolution.

In some implementations, the quadtree CFA mosaic 696 may be read-out on a per slice basis by the slice read-out interface 652 of the image processing architecture shown in FIG. 6A. In some implementations, the image preprocessing architecture 680 reduces the image capture and read-out latency 512 by performing one or more operations and/or algorithms associated with the image processing architecture 246 on the quadtree CFA mosaic 696 on a per slice basis. In some implementations, the image preprocessing architecture 680 reduces the image processing latency 514 by reducing the resolution or sampling rate associated with pixels outside of the focal region.

Figure 7:
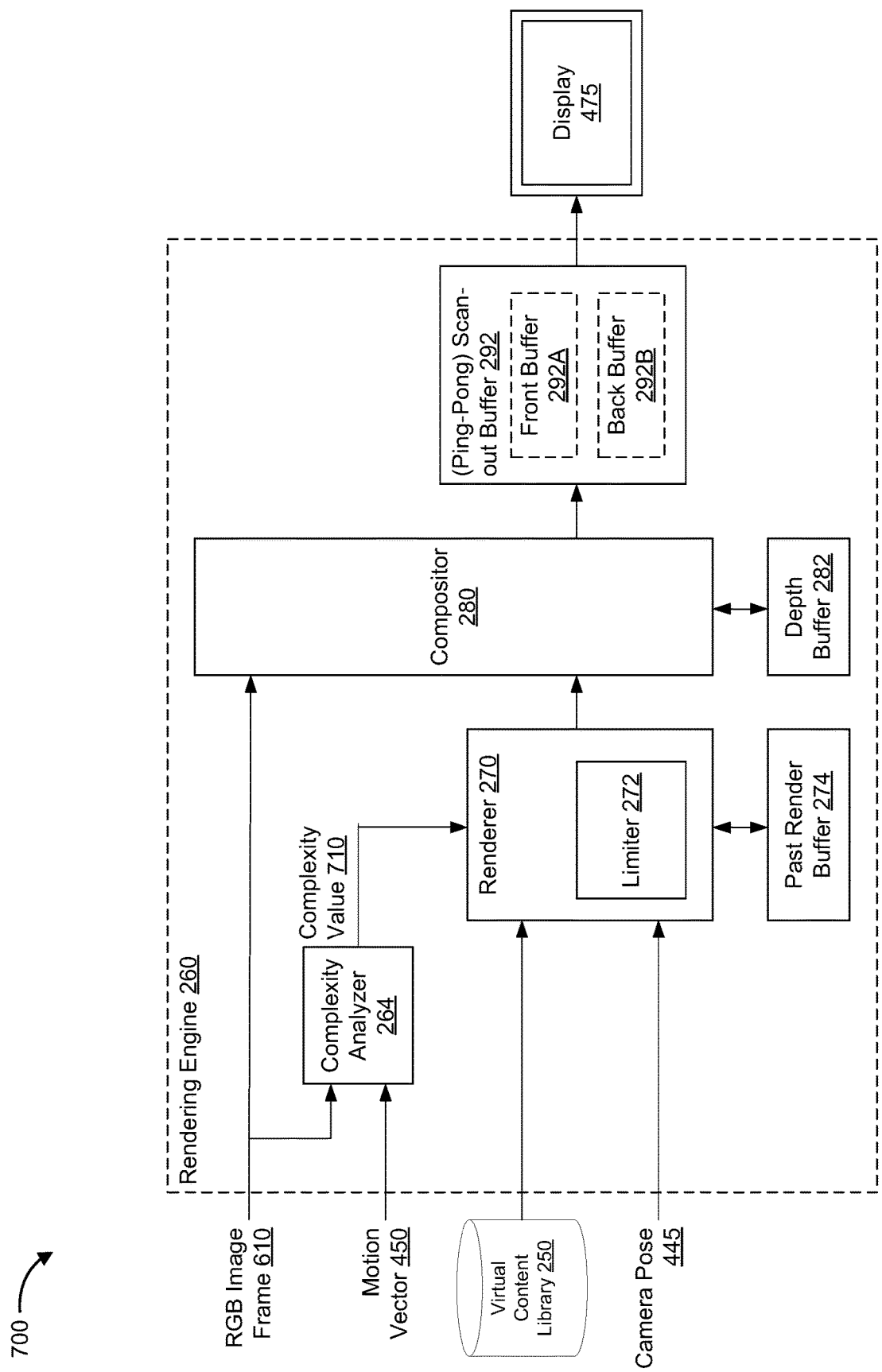
FIG. 7 illustrates a block diagram of an example rendering architecture in accordance with some implementations.

FIG. 7 illustrates a block diagram of an example rendering architecture 700 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the rendering architecture 700 includes the rendering engine 260 and the display 475.

As shown in FIG. 7, the complexity analyzer 264 determines a complexity value or vector of the physical environment 105 for a current time period based on the one or more RGB image frames 610 of the physical environment 105 and the motion vector 450. In some implementations, the complexity value 710 (or vector) indicates whether objects and/or scenery within the physical environment 105 are in motion and also indicates the frequency (or richness) of the physical environment 105 (e.g., a forest scene corresponds to a high frequency environment whereas a room with blank walls corresponds to a low frequency environment). In some implementations, the limiter 272 determines an estimated composite setup time for a next frame based at least in part on the complexity value 710.

In accordance with a determination that the estimated composite setup time fails to exceed a threshold time, the renderer 270 renders virtual content from the virtual content library 250 according to a perspective that corresponds to a camera pose 445 of the electronic device 120 relative to the physical environment 105 for a current time period, and the compositor 280 composites the rendered virtual content with the one or more RGB image frames 610 of the physical environment to generate a graphical environment (sometimes also referred to herein as the "XR environment") that is stored in the scan-out buffer 292. In accordance with a determination that the estimated composite setup time exceeds the threshold time, the renderer 270 foregoes rendering the virtual content from the perspective that corresponds to the camera pose 445 of the device electronic device 120 to the physical environment for the current time period, and the compositor 280 composites the rendered virtual content for a past time period in the past render buffer 274 with the one or more RGB image frames 610 of the physical environment 105 to generate a graphical environment (sometimes also referred to herein as the "XR environment").

In some implementations, the scan-out buffer 292 stores the one or more composited image frames for the graphical environment (sometimes also referred to herein as the "XR environment"). In one example, the scan-out buffer 292 corresponds to a ping-pong buffer including a front buffer 292A and a back buffer 292B. One of ordinary skill in the art will appreciate that the scan-out buffer 292 may be structured differently in various other implementations. Thereafter, the display 475 displays the composited image frame associated with the state of the graphical environment for the current time period. In some implementations, the display 475 is replaced with an external display. In some implementations, the display 475 is replaced with a cloud-based recorder, a re-encoder, or the like that is accessible to an end-user device.

Figure 8:
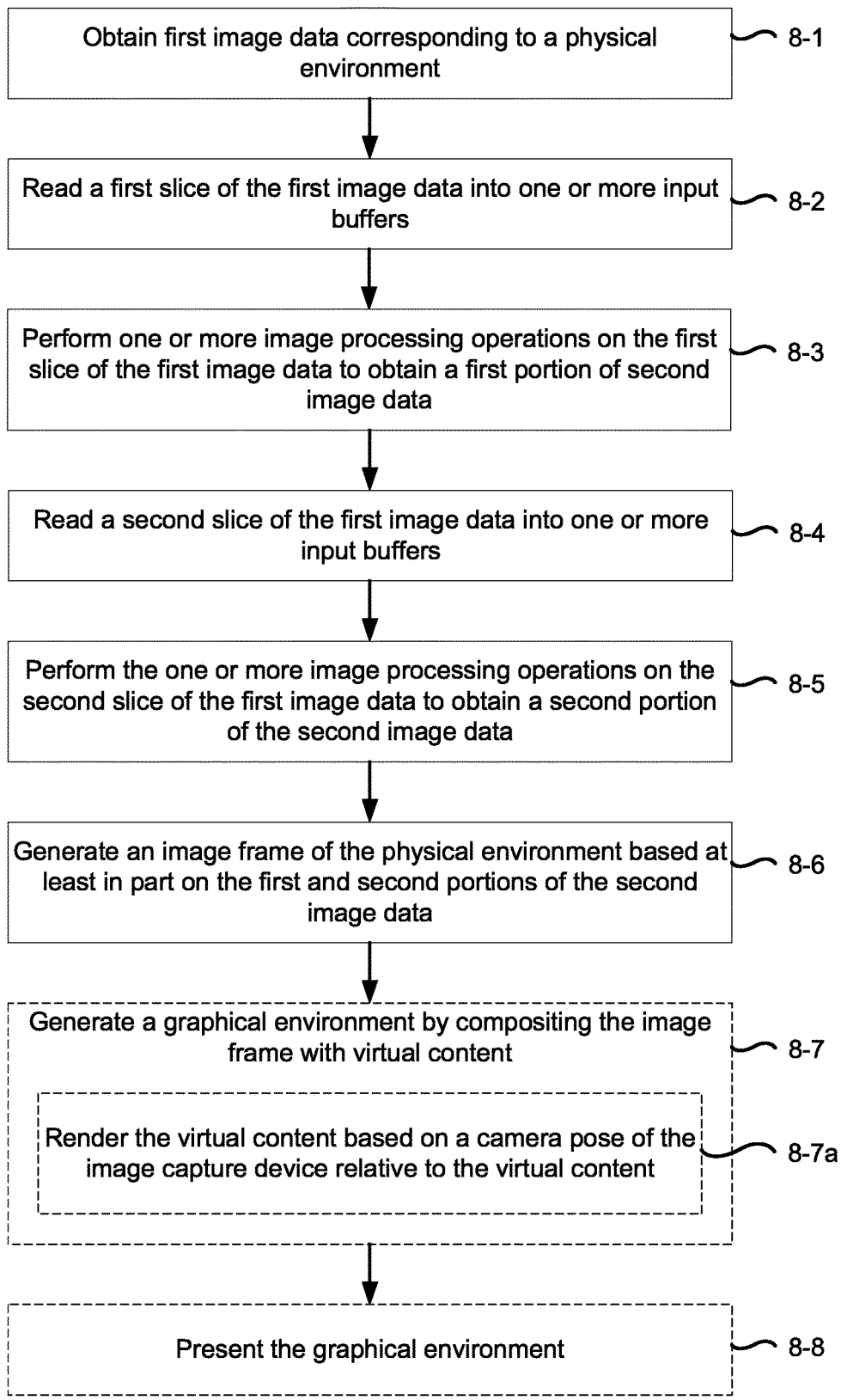
FIG. 8 is a flowchart representation of a method of reducing latency associated with an image read-out operation in accordance with some implementations.

FIG. 8 is a flowchart representation of a method 800 of reducing latency associated with an image read-out operation in accordance with some implementations. In various implementations, the method 800 is performed by a device including one or more processors (e.g., a CPU, microcontroller, etc.), non-transitory memory, an image processing architecture (e.g., a GPU or an ISP), and an image capture device including a photodiode (e.g., a CMOS or CCD photodiode) and a front-end architecture (e.g., the controller 110 in FIGS. 1 and 2; the electronic device 120 in FIGS. 1 and 3; or a suitable combination thereof), or a component thereof. For example, the front-end architecture includes an analog amplifier, an analog-to-digital converter (ADC), and a correction engine as shown in FIGS. 5A and 5B. In some implementations, the method 800 is performed by processing logic, including hardware, firmware, software, or a combination thereof. In some implementations, the method 800 is performed by a processor executing code stored in a non-transitory computer-readable medium (e.g., a memory). In various implementations, some operations in method 800 are, optionally, combined and/or the order of some operations is, optionally, changed.

In some instances, motion sickness (or cybersickness) induced by XR content is a major hurdle to the adoption thereof. One way to reduce motion sickness is to boost the frame rate to at least 60 fps. Put another way, the E2E image processing pipeline for video pass-through, which is shown above in FIG. 5, should be completed in approximately less than 20 ms. As one bottleneck in this E2E image processing pipeline, a read-out operation of a RAW image data frame from an image sensor consumes approximately 6 ms of the overall time budget. Furthermore, the image processing architecture (e.g., a GPU or an ISP) is idle until the entire RAW image data frame is read into a buffer. Thus, in various implementations, instead of waiting for the entire RAW image data frame to be read into the buffer, the device initiates image processing (e.g., white balance correction, de-mosaicking, color correction, gamma correction, sharpening, etc.) on a per-slice basis to reduce latency. As such, the methods described herein reduce latency by performing image processing on a per-slice basis instead of waiting for an entire RAW image data frame to be read-out from the image sensor.

As represented by block 8-1, the method 800 includes obtaining, via the image capture device, first image data corresponding to a physical environment. In some implementations, the first image data corresponds to RAW image data or a RAW image data frame. In some implementations, the ADC within the front-end architecture digitizes RAW analog image data from the photodiode into the RAW image data. For example, the first image data corresponds to a color filter array (CFA) mosaic. For example, with reference to FIGS. 4 and 6A, the device or a component thereof (e.g., the image capture device 370) captures first image data (e.g., CFA mosaic 606) of the physical environment 105.

As represented by block 8-2, the method 800 includes reading a first slice of the first image data into one or more input buffers of the image processing architecture. In some implementations, the first slice corresponds to a top row or line of the RAW image data frame. For example, with reference to FIG. 6A, the device or a component thereof (e.g., the slice read-out interface 652 of the image processing architecture 246) reads a first slice of the first image data (e.g., one of the RAW image data slices 608 or a first row of the CFA mosaic 606) into the RAW image data buffer 654.

In some implementations, the first slice of the first image data corresponds to a first predefined portion of RAW image data. For example, the first predefined portions correspond to an N×M pixel chunk of the first image data. In some implementations, the one or more input buffers (e.g., the RAW image data buffer 654 in FIG. 6A) corresponds to FIFO buffer(s) or the like.

As represented by block 8-3, the method 800 includes performing, at the image processing architecture, one or more image processing operations on the first slice of the first image data to obtain a first portion of second image data. In some implementations, the one or more image processing operations correspond to white balance correction, de-mosaicking, color correction, gamma correction, sharpening, and/or the like. For example, with reference to FIG. 6A, the device or a component thereof (e.g., the image processing architecture 246) performs one or more image processing operations (e.g., white balance 656, noise reduction 658, debayering/demosaicking 662, color correction 664, gamma correction 666, and sharpening 668) on the first slice of the first image data (e.g., one of the RAW image data slices 608 or a first row of the CFA mosaic 606) in order to produce a first portion of the second image data (e.g., one of the RGB data portions 609).

As represented by block 8-4, the method 800 includes reading a second slice of the first image data into the one or more input buffers of the image processing architecture. example, with reference to FIG. 6A, the device or a component thereof (e.g., the slice read-out interface 652 of the image processing architecture 246) reads a second slice of the first image data (e.g., one of the RAW image data slices 608 or a second row of the CFA mosaic 606) into the RAW image data buffer 654.

As represented by block 8-5, the method 800 includes performing, at the image processing architecture, the one or more image processing operations on the second slice of the first image data to obtain a second portion of the second image data. For example, with reference to FIG. 6A, the device or a component thereof (e.g., the image processing architecture 246) performs one or more image processing operations (e.g., white balance 656, noise reduction 658, debayering/demosaicking 662, color correction 664, gamma correction 666, and sharpening 668) on the second slice of the first image data (e.g., one of the RAW image data slices 608 or a first row of the CFA mosaic 606) in order to produce a second portion of the second image data (e.g., one of the RGB data portions 609).

As represented by block 8-6, the method 800 includes generating an image frame (e.g., an RGB image frame) of the physical environment based at least in part on the first and second portions of the second image data. In some implementations, the first image data corresponds to RAW image data, and wherein the image frame corresponds to an RGB image frame. For example, with reference to FIG. 6A, the device or a component thereof (e.g., the RGB combiner 674 of the image processing architecture 246) generates the image frame (e.g., the RGB image frame 610) based at least in part on the first and second portions of the second image data (e.g., the RGB data portions 609 in the RGB data buffer 672). In this example, the RGB data portions 609 are accumulated in an RGB data buffer 672 until the RGB combiner 674 combines RGB data portions 609 from the RGB data buffer 672 into an RGB image frame 610.

In some implementations, as represented by block 8-7, the method 800 includes generating a graphical environment by compositing the image frame with virtual content. In some implementations, the virtual content is stored in a virtual content library. In some implementations, the graphical environment is also referred to as an XR environment. In some implementations, as represented by block 8-7a, the method 800 includes rendering the virtual content based on a camera pose of the image capture device relative to the virtual content. In some implementations, the virtual content may be rendered on a per-slice basis. For example, with reference to FIGS. 2 and 7, the device or a component thereof (e.g., the renderer 270 of the rendering engine 260) renders virtual content from the virtual content library 250 based on a relative camera pose thereto. Continuing with this example, with reference to FIGS. 2 and 7, the device or a component thereof (e.g., the compositor 280 of the rendering engine 260) composites the rendered virtual content with the one or more image frames of the physical environment 105 to generate one or more composited image frames for a graphical environment (sometimes also referred to herein as the "XR environment").

In some implementations, as represented by block 8-8, the method 800 includes presenting the graphical environment via a display device. In some implementations, the device corresponds to a near-eye system that includes the display device, and wherein the image capture device corresponds to a scene-facing image sensor. For example, as shown in FIGS. 4 and 7, the device or a component thereof (e.g., the display 475 in FIG. 4) displays the graphical environment (e.g., the stream of rendered image frames 460 in FIG. 4) according to a refresh frequency (e.g., 60 Hz) of the display device. One of ordinary skill in the art will appreciate that in various implementations there may be multiple image capture devices and a display for each eye of the user.

In some implementations, the method 800 includes determining a focal region based on contextual information; and performing a pixel binning operation on the first image data based on the focal region to generate a quadtree version of the first image data. In some implementations, the contextual information includes at least one of head pose information, body pose information, limb pose information, or gaze direction information. For example, with reference to FIG. 4 and FIG. 6B, the device or a component thereof (e.g., the foveation engine 682 within the front-end architecture 376) determines a focal region based on the contextual information 440 (e.g., including gaze direction) and/or the motion vector 450. Continuing with this example, as shown in FIG. 6B, the pixel binning engine 684 produces a quadtree CFA mosaic 696 where pixels within the focal region are associated with smaller quad nodes resulting in higher resolution as compared to pixels outside of the focal region associated with larger quad nodes resulting in lower resolution.

Figure 9:
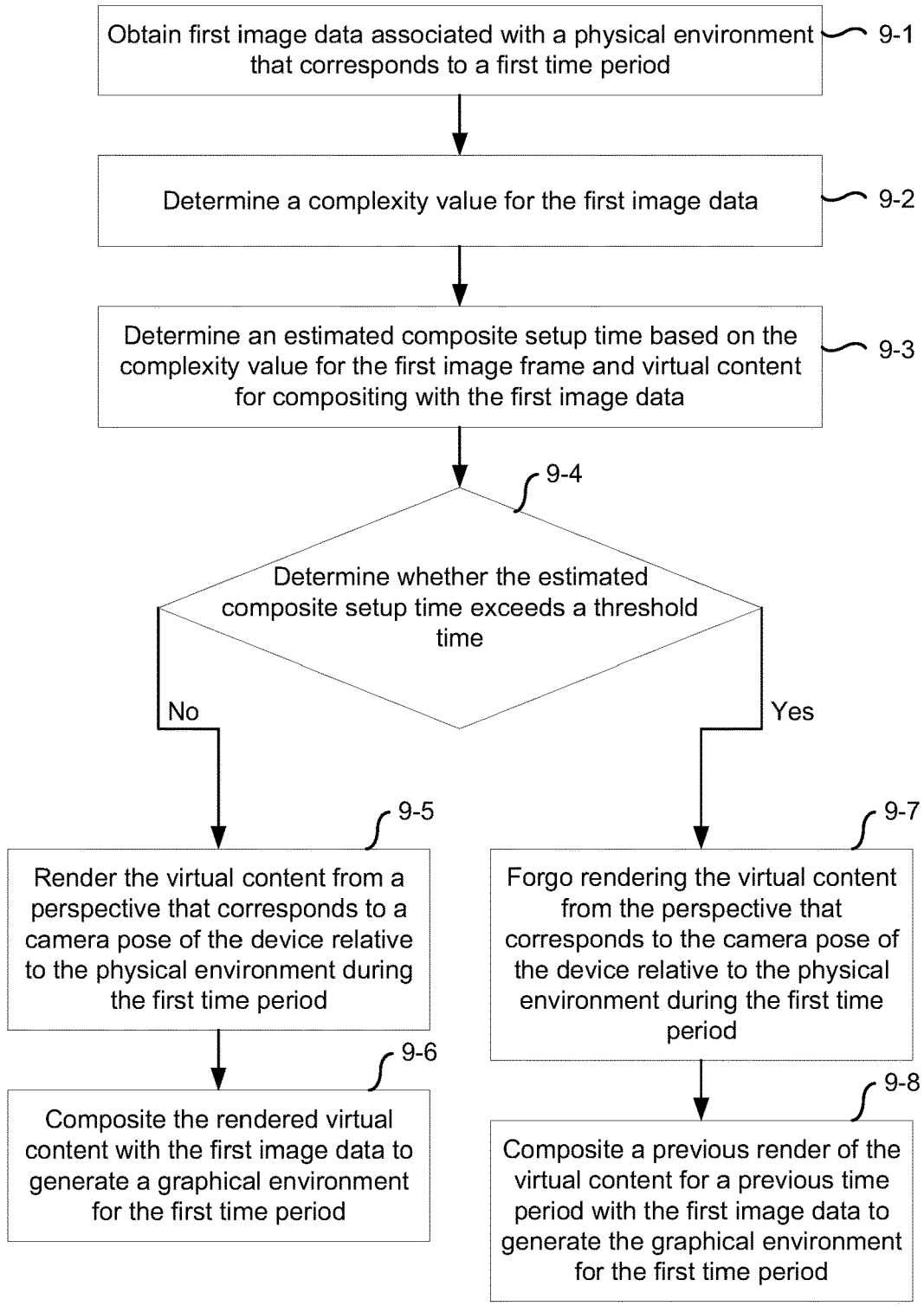
FIG. 9 is a flowchart representation of a method of reducing latency associated with a display scan-out operation in accordance with some implementations.

FIG. 9 is a flowchart representation of a method 900 of reducing latency associated with a display scan-out operation in accordance with some implementations. In various implementations, the method 900 is performed by a device with non-transitory memory and one or more processors coupled with the non-transitory memory (e.g., the controller 110 in FIGS. 1 and 2; the electronic device 120 in FIGS. 1 and 3; or a suitable combination thereof), or a component thereof. In some implementations, the method 900 is performed by processing logic, including hardware, firmware, software, or a combination thereof. In some implementations, the method 900 is performed by a processor executing code stored in a non-transitory computer-readable medium (e.g., a memory). In various implementations, some operations in method 900 are, optionally, combined and/or the order of some operations is, optionally, changed.

As described above, in some instances, the E2E image processing pipeline for video pass-through applications, which is shown above in FIG. 5, should be completed in approximately less than 20 ms. Display scan-out is another bottleneck in this E2E image processing pipeline. Once a full rendered frame is available in the front buffer, the full frame is scanned out from the front buffer to the display in a row-by-row fashion (i.e., raster scanning) in order to update the pixels of the display. Once all pixel data for the rendered frame has been transferred to the display, a backlight illuminates all the pixels at once with a short, bright light, so all the pixel updates become visible simultaneously. This is often referred to as a global display and is the technique used by most LCOS, DLP, and LCD display devices.

The operation of a global display introduces a synchronization problem whereby the GPU should produce rendered frames at a rate that keeps up with the refresh rate of the display. Otherwise frames will be repeated and fall out of synchronization with the live video feed of the physical environment, which in turn disorients a user and may induce motion sickness (or cybersickness). As one example, for a display with a refresh rate of 60 Hz, scan-out begins again at line 0 every 16 ms whether the GPU has finished rendering or not.

For video pass-through applications, rendering is complicated by not only rendering virtual content from a certain perspective but also compositing RGB image frames of the physical environment with the rendered virtual content with the correct depth and occlusion. Thus, in various implementations, the RGB image frames of the physical environment are prioritized over rendering virtual content to reduce rendering latency. This prioritization scheme also reduces the likelihood that a user may become disoriented or afflicted with cybersickness As such, the methods described herein use scene complexity as a proxy for increased rendering time and prioritize processing RGB image frames of the physical environment over rendering virtual content from the current perspective in order to keep up with a display refresh rate.

One of ordinary skill in the art will appreciate that the method 900 described herein is also applicable to non-global displays, such as rolling displays, or displays employing various other types of rendering schemes such as ray tracing, path tracing, or the like. For example, when a rolling display is used by the device, the front buffer may be separated into sections that each handle a slice of the rendered image to be displayed via the display. Continuing with this example, the separate front buffer allows for a first splice to start being written to for the upcoming frame while the scan-out operation is reading a second splice of a front buffer broken down into N splices.

As represented by block 9-1, the method 900 includes obtaining first image data of a physical environment that corresponds to a first time period. For example, with reference to FIG. 4, the first image data corresponds to the RGB image frames 420 of the physical environment 105 after being processed by the image processing architecture 246.

One of ordinary skill in the art will appreciate that the method 900 may operate on a per image frame basis, a per slice basis, or the like. In some implementations, the first image data corresponds to a first slice of the first image frame. Thus, in one example, the method 900 may be performed by the device on a per slice basis. In some implementations, the first image data corresponds to a first image frame. Thus, in another example, the method 900 may be performed by the device on a per image frame basis.

In some implementations, the method 900 includes: obtaining contextual information that includes at least one of head pose information, body pose information, limb pose, or gaze direction information; and determining the camera pose of the device relative to the physical environment during the first time period based on contextual information. As one example, with reference to FIG. 4, the device or a component thereof (e.g., the context analysis engine 244 in FIG. 4) generates contextual information 440 based on position/rotation/movement information 402 from the IMU 362 or the like, gaze direction information 404 from the eye tracking engine 364, and body/limb/head pose information 406 from the body/limb/head pose tracking engine 366. Continuing with this example, the device or a component thereof (e.g., the camera pose determiner 245 in FIG. 4) determines a camera pose 445 of the electronic device 120 (and also, ergo, the user 150) relative to the physical environment 105 based on the contextual information 440.

As represented by block 9-2, the method 900 includes determining a complexity value for the first image data. For example, the device determines the complexity value (or vector) based on a motion vector related to the first image data and one or more previous image data portions, characteristics of the first image data, and/or the like. For example, with reference to FIG. 7, the device or a component thereof (e.g., the complexity analyzer 264 in FIG. 7) determines a complexity value 710 or vector of the physical environment 105 for a current time period based on the one or more RGB image frames 610 of the physical environment 105 and the motion vector 450. In some implementations, the complexity value 710 (or vector) indicates whether objects and/or scenery within the physical environment 105 are in motion and also indicates the frequency (or richness) of the physical environment 105 (e.g., a forest scene corresponds to a high frequency environment whereas a room with blank walls corresponds to a low frequency environment). In some implementations, the limiter 272 determines an estimated composite setup time for a next image data portion based at least in part on the complexity value 710.

In some implementations, the method 900 includes determining a motion vector based on the first image data and one or more previous image data portion that correspond to time periods prior to the first time period. In some implementations, determining the complexity value for the first image data is based on characteristics of the first image data and the motion vector. For example, with reference to FIG. 4, the device or a component thereof (e.g., the motion estimation engine 248 in FIG. 4) determines a motion vector 450 based on the RGB image frames 420.

As represented by block 9-3, the method 900 includes determining an estimated composite setup time based on the complexity value for the first image data and virtual content for compositing with the first image data. For example, with reference to FIG. 4, the device or a component thereof (e.g., the limiter 272 in FIG. 7) determines an estimated composite setup time for a next data based at least in part on the complexity value 710.

In some implementations, the estimated composite setup time includes: (A) a first time period for rendering the virtual content from the perspective that corresponds to the camera pose of the device relative to the physical environment during the first time period and (B) a second time period for compositing the rendered virtual content with the first image data.

As represented by block 9-4, the method 900 includes determining whether the estimated composite setup time exceeds a threshold time. For example, with reference to FIG. 4, the device or a component thereof (e.g., the limiter 272 in FIG. 7) determines whether the estimated composite setup time for the next image data portion exceeds the threshold time. In some implementations, the threshold time is determined based on a refresh rate of the display device and pre-rendering latency. For example, the threshold time is calculated based on a preferred frame rate (e.g., 60 fps or 90 fps) and/or a refresh rate of the display device (e.g., 60 Hz).

In accordance with a determination that the estimated composite setup time fails to exceed the threshold time ("No" branch from block 9-4), as represented by blocks 9-5 and 9-6, the method 900 includes: rendering the virtual content from a perspective that corresponds to a camera pose of the device relative to the physical environment during the first time period; and compositing the rendered virtual content with the first image data to generate a graphical environment for the first time period. In accordance with a determination that the estimated composite setup time fails to exceed a threshold time, with reference to FIG. 7, the device or a component thereof (e.g., the renderer 270 in FIG. 7) renders virtual content from the virtual content library 250 according to a perspective that corresponds to a camera pose 445 of the electronic device 120 relative to the physical environment 105 for a current time period, and the device or a component thereof (e.g., the compositor 280 in FIG. 7) composites the rendered virtual content with the one or more RGB image frames 610 of the physical environment to generate a graphical environment (sometimes also referred to herein as the "XR environment") that is stored in the scan-out buffer 292.

In some implementations, compositing the rendered virtual content with the first image data to generate the graphical environment for the first time period is based on a depth buffer. In some implementations, the compositor 280 includes (or accesses) a depth buffer 282. In some implementations, the depth buffer 282 corresponds to a depth mesh, a point cloud, and/or the like for the physical environment in order to maintain appropriate z-order between objects and scenery in the physical environment and the virtual content.

In accordance with a determination that the estimated composite setup time exceeds the threshold time ("Yes" branch from block 9-4), as represented by blocks 9-7 and 9-8, the method 900 includes: forgoing rendering the virtual content from the perspective that corresponds to the camera pose of the device relative to the physical environment during the first time period; and compositing a previous render of the virtual content for a previous time period with the first image data to generate the graphical environment for the first time period. In accordance with a determination that the estimated composite setup time exceeds the threshold time, with reference to FIG. 7, the device or a component thereof (e.g., the renderer 270 in FIG. 7) foregoes rendering the virtual content from the perspective that corresponds to the camera pose 445 of the device electronic device 120 to the physical environment for the current time period, and the device or a component thereof (e.g., the compositor 280 in FIG. 7) composites the rendered virtual content for a past time period in the past render buffer 274 with the one or more RGB image frames 610 of the physical environment 105 to generate a graphical environment (sometimes also referred to herein as the "XR environment").

In some implementations, the method 900 includes presenting the graphical environment via a display device. In some implementations, the device corresponds to near-eye system that includes the display device. In some implementations, the scan-out buffer 292 stores the one or more composited image data portions for the graphical environment (sometimes also referred to herein as the "XR environment"). For example, as shown in FIG. 7, the device or a component thereof (e.g., the display 475 in FIG. 7) displays the graphical environment after obtaining (e.g., receiving or retrieving) the one or more composited image data portions for the graphical environment from the scan-out buffer 292. One of ordinary skill in the art will appreciate that in various implementations there may be multiple image capture devices and a display for each eye of the user.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including one or more processors, non-transitory memory, an image processing architecture, and an image capture device including a photodiode and a front-end architecture:
obtaining, via the image capture device, first image data corresponding to a physical environment;
reading a first slice of the first image data into one or more input buffers of the image processing architecture;
performing, at the image processing architecture, one or more image processing operations on the first slice of the first image data to obtain a first portion of second image data;
reading a second slice of the first image data into the one or more input buffers of the image processing architecture;
performing, at the image processing architecture, the one or more image processing operations on the second slice of the first image data to obtain a second portion of the second image data; and
generating an image frame of the physical environment based at least in part on the first and second portions of the second image data.

2. The method of claim 1, wherein the one or more image processing operations correspond to one of: white balance correction, de-mosaicking, color correction, gamma correction, or sharpening.

3. The method of claim 1, wherein the first slice of the first image data corresponds to a first row or line of RAW image data.

4. The method of claim 1, wherein the first slice of the first image data corresponds to a first predefined portion of RAW image data.

5. The method of claim 1, wherein the first image data corresponds to RAW image data, and wherein the image frame corresponds to an RGB image frame.

6. The method of claim 1, further comprising:
generating a graphical environment by compositing the image frame with virtual content.

7. The method of claim 6, further comprising:
rendering the virtual content based on a camera pose of the image capture device relative to the virtual content.

8. The method of claim 6, further comprising:
presenting the graphical environment via a display device.

9. The method of claim 8, wherein the device corresponds to a near-eye system that includes the display device, and wherein the image capture device corresponds to a scene-facing image sensor.

10. The method of claim 1, wherein the front-end architecture digitizes analog image data into the first image data.

11. The method of claim 10, further comprising:
determining a focal region based on contextual information; and
performing a pixel binning operation on the first image data based on the focal region to generate a quadtree version of the first image data.

12. The method of claim 11, wherein the contextual information includes at least one of head pose information, body pose information, limb pose information, or gaze direction information.

13. A device comprising:
one or more processors;
a non-transitory memory;
an image processing architecture;
an image capture device including a photodiode and a front-end architecture; and
one or more programs stored in the non-transitory memory, which, when executed by the one or more processors, cause the device to:
obtain, via the image capture device, first image data corresponding to a physical environment;
read a first slice of the first image data into one or more input buffers of the image processing architecture;
perform, at the image processing architecture, one or more image processing operations on the first slice of the first image data to obtain a first portion of second image data;
read a second slice of the first image data into the one or more input buffers of the image processing architecture;
perform, at the image processing architecture, the one or more image processing operations on the second slice of the first image data to obtain a second portion of the second image data; and
generate an image frame of the physical environment based at least in part on the first and second portions of the second image data.

14. The device of claim 13, wherein the one or more programs further cause the device to:
generate a graphical environment by compositing the image frame with virtual content.

15. The device of claim 14, wherein the one or more programs further cause the device to:
render the virtual content based on a camera pose of the image capture device relative to the virtual content.

16. The device of claim 14, wherein the one or more programs further cause the device to:
determine a focal region based on contextual information; and perform a pixel binning operation on the first image data based on the focal region to generate a quadtree version of the first image data.

17. The device of claim 16, wherein the contextual information includes at least one of head pose information, body pose information, limb pose information, or gaze direction information.

18. A non-transitory memory storing one or more programs, which, when executed by one or more processors of a device with an image processing architecture and an image capture device including a photodiode and a front-end architecture, cause the device to:
- obtain, via the image capture device, first image data corresponding to a physical environment;
- read a first slice of the first image data into one or more input buffers of the image processing architecture;
- perform, at the image processing architecture, one or more image processing operations on the first slice of the first image data to obtain a first portion of second image data;
- read a second slice of the first image data into the one or more input buffers of the image processing architecture;
- perform, at the image processing architecture, the one or more image processing operations on the second slice of the first image data to obtain a second portion of the second image data; and
- generate an image frame of the physical environment based at least in part on the first and second portions of the second image data.

19. The non-transitory memory of claim 18, wherein the one or more programs further cause the device to:
- generate a graphical environment by compositing the image frame with virtual content.

20. The non-transitory memory of claim 19, wherein the one or more programs further cause the device to:
- render the virtual content based on a camera pose of the image capture device relative to the virtual content.

21. The non-transitory memory of claim 18, wherein the one or more programs further cause the device to:
- determine a focal region based on contextual information; and
- perform a pixel binning operation on the first image data based on the focal region to generate a quadtree version of the first image data.

22. The non-transitory memory of claim 21, wherein the contextual information includes at least one of head pose information, body pose information, limb pose information, or gaze direction information.

* * * * *